US007547031B2

(12) United States Patent
Moran et al.

(10) Patent No.: US 7,547,031 B2
(45) Date of Patent: Jun. 16, 2009

(54) REVERSIBLE WHEELCHAIR

(76) Inventors: Justin M. Moran, 486 Hiawatha Dr., Carol Stream, IL (US) 60188; Alan G Moran, Hemingway House, Ander Road, Dundalk (IE)

( * ) Notice: Subject to any disclaimer, the term of this patent is extended or adjusted under 35 U.S.C. 154(b) by 123 days.

(21) Appl. No.: 11/820,210

(22) Filed: Jun. 18, 2007

(65) Prior Publication Data

US 2008/0309047 A1 Dec. 18, 2008

Related U.S. Application Data

(60) Provisional application No. 60/814,177, filed on Jun. 16, 2006.

(51) Int. Cl.
*B62M 1/14* (2006.01)

(52) U.S. Cl. ..................... 280/304.1; 280/250.1; 5/86.1

(58) Field of Classification Search .............. 280/250.1, 280/304.1; 297/DIG. 4, 344.21, 344.22; 180/65.1; 5/86.1
See application file for complete search history.

(56) References Cited

U.S. PATENT DOCUMENTS

| | | | | |
|---|---|---|---|---|
| 4,274,503 | A | 6/1981 | Mackintosh | |
| 4,477,117 | A * | 10/1984 | Higgs | 297/45 |
| 4,520,893 | A | 6/1985 | Keough | |
| 6,220,620 | B1 * | 4/2001 | Harroun | 280/650 |
| 6,431,650 | B1 * | 8/2002 | Visone | 297/339 |
| 6,684,969 | B1 | 2/2004 | Flowers et al. | |
| 2007/0216131 | A1 * | 9/2007 | Potappel | 280/250.1 |
| 2007/0222171 | A1 * | 9/2007 | Norman et al. | 280/250.1 |
| 2008/0133089 | A1 * | 6/2008 | Bayomy et al. | 701/49 |
| 2008/0284218 | A1 * | 11/2008 | King et al. | 297/217.3 |

* cited by examiner

*Primary Examiner*—Tony H. Winner
(74) *Attorney, Agent, or Firm*—James Ray & Assoc.

(57) ABSTRACT

A wheelchair having a rotatable vertically adjustable seat that can rotate at least 180 degrees. A vertical adjustment means adjusts the seat from a base position to an elevation above the diameter of the wheel chair drive wheels. The seat can swivel or be fixed by an anti-rotation means. The wheelchair can be conventionally configured with guide wheels forward or reversed with drive wheels forward for use on rough ground or uneven surfaces.

14 Claims, 3 Drawing Sheets

REVERSIBLE WHEELCHAIR

CROSS REFERENCE TO RELATED APPLICATION

This patent application is related to and claims priority from U.S. Provisional Patent Application Ser. No. 60/814,177 filed Jun. 16, 2006.

FIELD OF THE INVENTION

The present invention relates, in general, to adjustable height wheelchairs and, more particularly, this invention relates to the wheelchairs that are capable traveling with conventional wheel arrangement reversed.

BACKGROUND OF THE INVENTION

Prior to the conception and development of the present invention, as is generally well known in the prior art, power driven wheelchair designs in which the chair could be driven forwards or backwards. This obviates turning the chair in narrow passageways. It is preferable to have the drive wheels forward of the guide wheels for use on rough ground or uneven surfaces. The previous designs were applicable only to power driven chairs. In the conventional occupant driven or assistant driven chair a turning maneuver was required to reverse the direction of the wheelchair.

SUMMARY OF THE INVENTION

The present invention provides a wheel chair with an adjustable height chair. By adjusting the height, the chair is capable of rotation about a vertical axis. The chair rotation in an elevated position allows the chair to be operated with the guide wheels in the rear position and the drive wheels in the forward position. On rough ground or uneven surfaces, the chair has greater stability in the reverse of the conventional configuration.

OBJECTS OF THE INVENTION

It is, therefore, one of the primary objects of the present invention to provide a wheel chair operable with the guide wheels in the rear position for added stability over rough ground or uneven surfaces Another object of the present invention is to provide a wheelchair which can reverse direction without turning.

Still another object of the present invention is to provide a comfortable wheel chair capable of swiveling.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
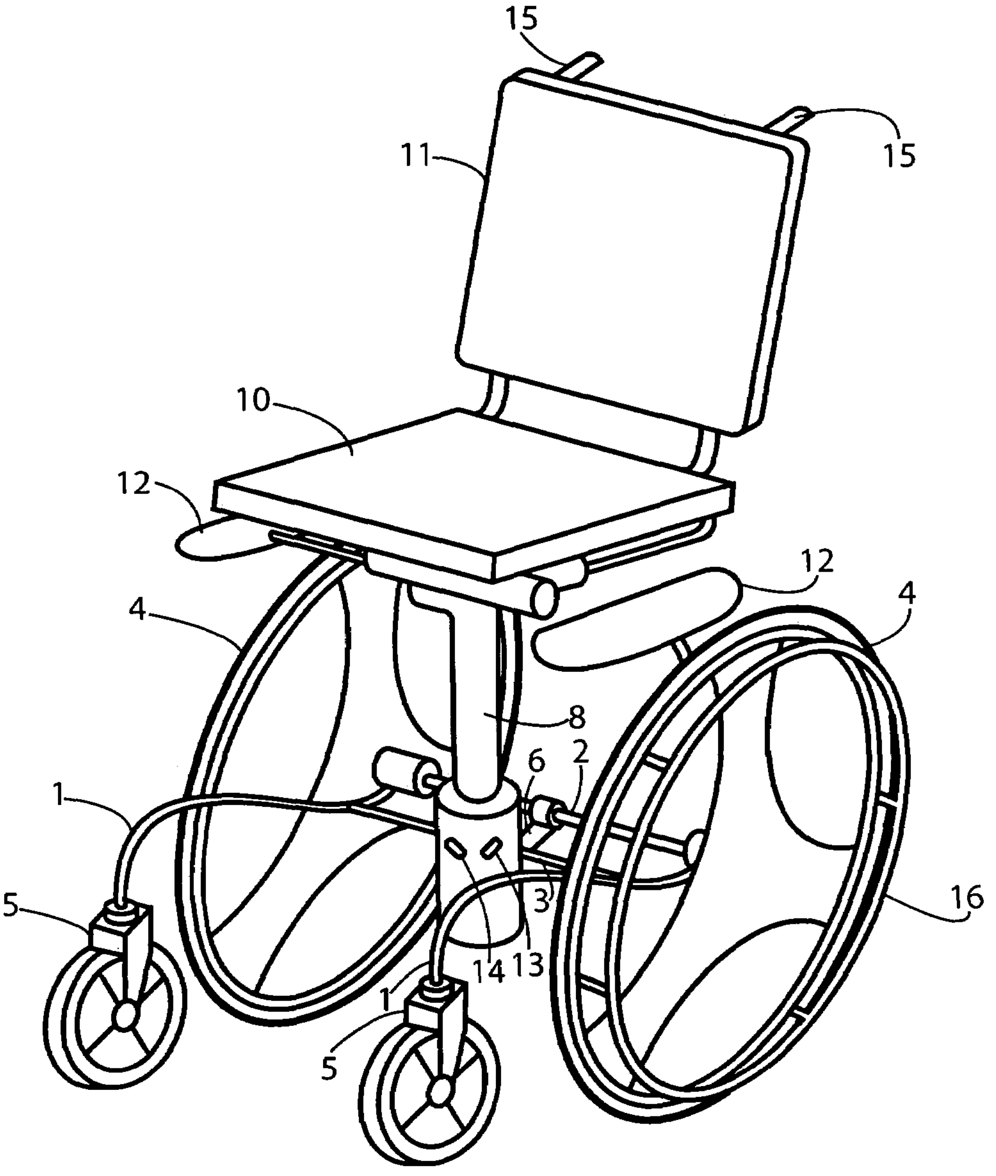
FIG. 1 is a perspective view of the wheelchair in the conventional configuration

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
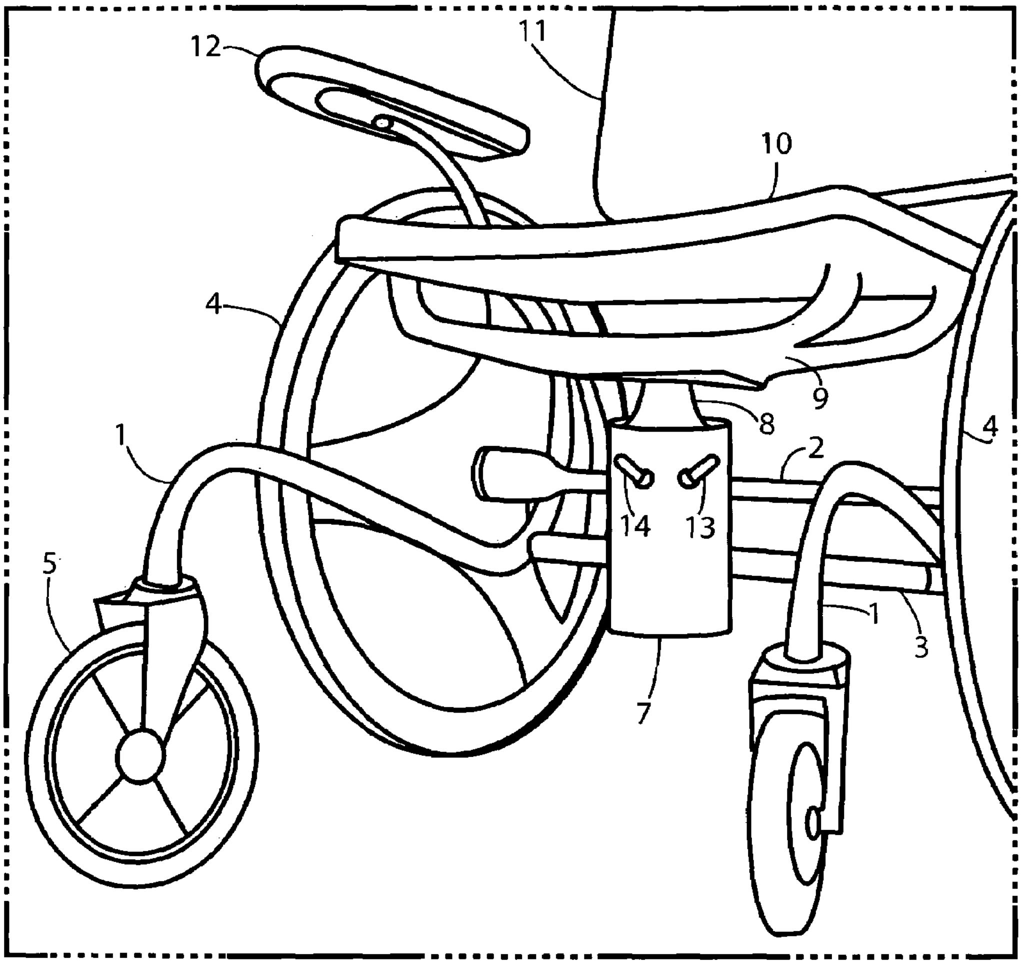
FIG. 2 is a partial perspective view of the wheelchair undercarriage.

Reference is now made, more particularly, to FIGS. 1 and 2 illustrate the wheelchair in the conventional configuration. The wheel chair has a longitudinal axis, a transverse axis and a vertical axis. Two generally parallel S-shaped forks spaced at a predetermined distance along the longitudinal axis. The forks are attached to an axle 2 and support member 3 generally perpendicular to the forks 1. Drive wheels 4 are attached to opposing ends of the axle 2. The drive wheels 4 are independently rotatable. Two guide wheels 5 are attached to the bottom end of each fork 1. The guide wheels 5 in the preferred embodiment are casters that are rotatable 360 degrees. In the conventional configuration, the guide wheels are forward in the direction of travel and the drive wheels are rearward.

There is a central support member 6 attached to the support member 3 and the axle 2.

A tube 7 is attached to support member 3. The tube 7 receives a post 8. The inner diameter of tube 7 is greater than the outer diameter of post 8. A vertical seat adjustment means is contained in said tube 7 and not shown. The adjustment means is a conventional means as used in office chairs. The preferred embodiment has as pneumatic or hydraulic spring. Post 8 to rotates within tube 7. A conventional vertical adjustment control 13 is connected to the vertical adjustment means. An anti-rotation means for chairs are well known and not shown is within tube 7 is not shown. In the preferred embodiment a lever 14 actuates a cam preventing rotation of the tube about the vertical axis.

In another embodiment, the central support member 6 is attached to tube 7.

A pedestal 9 is attached to the top of tube 8. The bottom of seat 10 is attached to pedestal 9. Backrest 11 is attached to seat 10. In the preferred embodiment, an armrest 12 is attached to the top end of each fork. Also, in the preferred embodiment, handles 15 are attached to the back of backrest 11 to enable an assistant to push the wheelchair. Also in the preferred embodiment a circular drive handle 16 is attached to the outside each of wheel 4 to permit the occupant to propel the wheelchair.

In FIG. 1 the elevation of the seat and pedestal is above the diameter of the drive wheels 5 permits seat 10 to rotate freely. The seat 10 and pedestal 9 are adjustable from an elevation generally adjacent from the top of tube 7 to an elevation above the diameter of drive wheels In the preferred embodiment the seat 10 can rotate 360 degrees. This permits the occupant to swivel the chair or to reverse the wheelchair configuration with the drive wheels 4 forward in the direction of travel for use on rough ground or uneven surfaces. The rotation of seat 10 also permits the occupant to reverse direction in a narrow passageway without turning.

Figure 3:
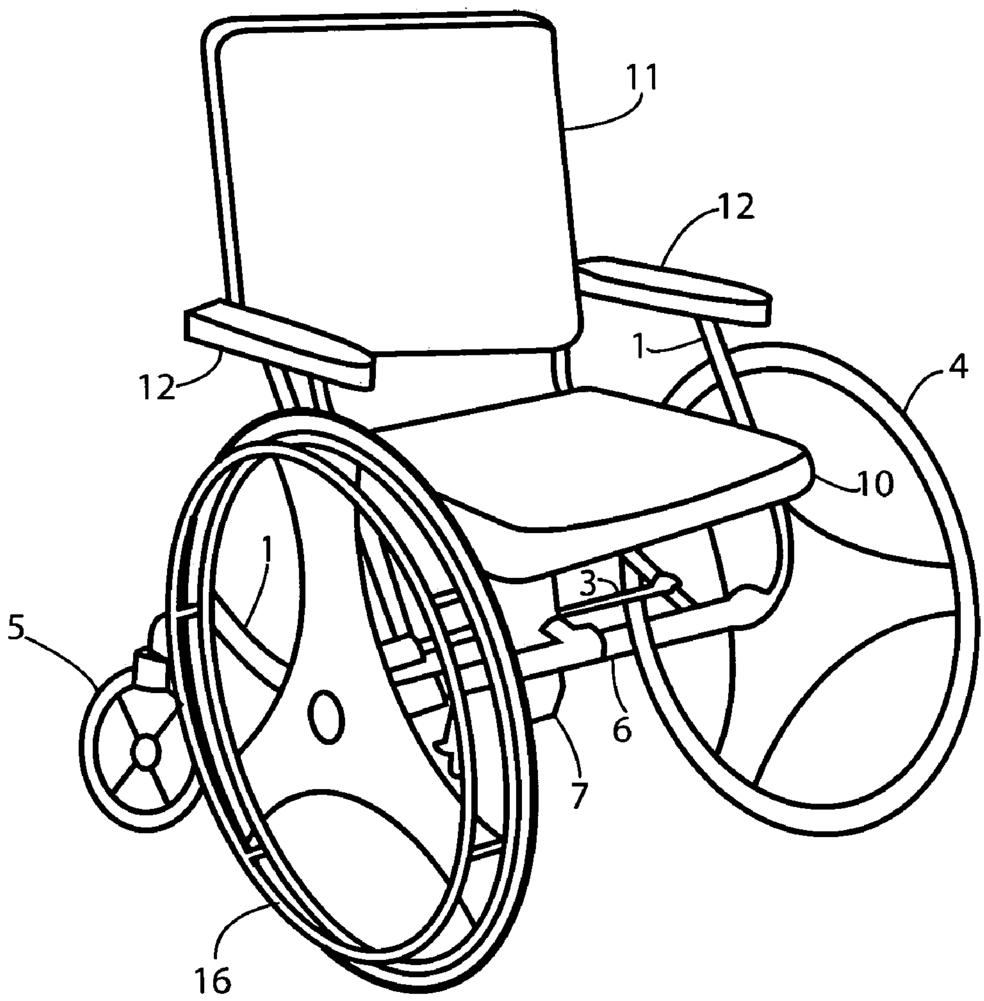
FIG. 3 is a perspective view of the wheelchair in reverse configuration

In FIG. 3, the seat 10 is in the lower position and the in the reverse configuration. The anti-rotation means actuated by lever 14 permits the chair to be securely propelled.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

We claim:

1. A wheelchair with a longitudinal axis, transverse axis and vertical axis comprising:

an axle disposed along the transverse axis, at least two opposing wheels rotatably attached to said axle;

at least two fork members, generally parallel and spaced at a predetermined spacing, disposed along said longitudinal axis, said fork member fabricated in curve shape with said top end terminating in a generally horizontal surface and said bottom end terminating in a generally vertical surface and attached to said axle;

a guide wheel attached to said bottom end of each of said forks;

a support member attached to said fork members;

a tube having a top end and bottom end, disposed along said vertical axis is attached to said support member;

a central support member is attached to said tube and said axle;

a post with top end and a bottom end having an exterior diameter less than the interior diameter of said tube, said post capable of rotating at least 180 degrees about said vertical axis of said wheelchair;

a means for adjusting the elevation of said post having a bottom end and a top end, received within said tube, said bottom end of said elevation adjusting means generally adjacent to said bottom end of said tube, said top end of said elevation adjusting means generally adjacent to said bottom end of said post, said means having a control to actuate said adjusting means, said adjusting means to raise the top of said post from generally adjacent to the top of said tube to an elevation above the diameter of said wheels;

a pedestal attached to the top of said post; and a chair with a seat portion with a top portion and a bottom portion and a backrest portion with a front portion and a back portion, said bottom portion of said seat portion is attached to said pedestal.

2. A wheelchair of claim 1 further comprising an anti-rotation means for locking the rotation of said tube, said anti-rotation means having a control to optionally actuate said anti-rotation means.

3. A wheelchair of claim 1 in which said vertical adjusting means is of a group of a pneumatic or hydraulic spring.

4. A wheel chair of claim 1 in which said anti-rotation means is a cam lever.

5. A wheel chair of claim 1 which further comprises an outer wheel attached to said wheels at a predetermined spacing to permit the occupant to propel said chair.

6. A wheel chair of claim 1 which further comprises at least one handle attached to the said back portion of said backrest portion of said chair.

7. A wheelchair of claim 1 further comprising a hand rest attached to each of said top of said forks.

8. A wheelchair with a longitudinal axis, transverse axis and vertical axis comprising:

an axle disposed along the transverse axis, at least two opposing wheels rotatably attached to said axle;

at least two fork members, generally parallel and spaced at a predetermined spacing, disposed along said longitudinal axis, said fork member fabricated in curve shape with said top end terminating in a generally horizontal surface and said bottom end terminating in a generally vertical surface and attached to said axle;

a caster rotatably attached to said bottom end of each of said forks;

a support member attached by to said fork members;

a tube having a top end and bottom end, disposed along said vertical axis is attached to said support member;

a central support member is attached to said support member and said axle;

a post with top end and a bottom end having an exterior diameter less than the interior diameter of said tube, said bottom end of said post received by said tube proximal to said bearing, said post capable of rotating at least 180 degrees about said vertical axis of said wheelchair;

a means for adjusting the elevation of said post having a bottom end and a top end, received within said tube, said bottom end of said elevation adjusting means generally adjacent to said bottom end of said tube, said top end of said elevation adjusting means generally adjacent to said bottom end of said post, said means having a control to actuate said adjusting means, said adjusting means to raise the top of said post from generally adjacent to the top of said tube to an elevation above the diameter of said wheels;

a pedestal attached to the top of said post; and a chair with a seat portion with a top portion and a bottom portion and a backrest portion with a front portion and a back portion, said bottom portion of said seat portion is attached to said pedestal.

9. A wheelchair of claim 8 further comprising an anti-rotation means for locking the rotation of said tube, said anti-rotation means having a control to optionally actuate said anti-rotation means.

10. A wheelchair of claim 8 in which said vertical adjusting means is of a group of a pneumatic or hydraulic spring.

11. A wheel chair of claim 8 in which said anti-rotation means is lever actuated cam frictionally engaging said post.

12. A wheel chair of claim 8 which further comprises an outer wheel attached to said wheels at a predetermined spacing to permit the occupant to propel said chair.

13. A wheel chair of claim 8 which further comprises at least one handle attached to the said back portion of said backrest portion of said chair.

14. A wheelchair of claim 8 further comprising a hand rest attached to each of said top of said forks.

* * * * *